United States Patent
Wood

(10) Patent No.: US 12,231,499 B1
(45) Date of Patent: Feb. 18, 2025

(54) PROPERTY DAMAGE DETECTION SYSTEM AND METHOD OF USE

(71) Applicant: Donald G Wood, Bedford, TX (US)

(72) Inventor: Donald G Wood, Bedford, TX (US)

(*) Notice: Subject to any disclaimer, the term of this patent is extended or adjusted under 35 U.S.C. 154(b) by 0 days.

(21) Appl. No.: 18/105,529

(22) Filed: Feb. 3, 2023

Related U.S. Application Data

(63) Continuation of application No. 17/829,016, filed on May 31, 2022, now abandoned, which is a continuation-in-part of application No. 16/893,171, filed on Jun. 4, 2020, now abandoned.

(51) Int. Cl.
*H04L 67/12* (2022.01)

(52) U.S. Cl.
CPC .................. *H04L 67/12* (2013.01)

(58) Field of Classification Search
CPC ........ H04L 67/12; G16Y 10/80; G16Y 40/10; G16Y 20/10
See application file for complete search history.

(56) References Cited

U.S. PATENT DOCUMENTS

| | | | |
|---|---|---|---|
| 10,514,669 B1* | 12/2019 | Call | G08B 21/20 |
| 11,131,597 B1* | 9/2021 | Oakes, III | G08B 5/22 |
| 2014/0032433 A1* | 1/2014 | Eick | G06Q 10/10 |
| | | | 705/314 |

OTHER PUBLICATIONS

G. Suciu, M. Anwar, A. Ganaside and A. Scheianu, "IoT time critical applications for environmental early warning," 2017 9th International Conference on Electronics, Computers and Artificial Intelligence (ECAI), Targoviste, Romania, 2017, pp. 1-4, doi: 10.1109/ECAI.2017.8166451. (Year: 2017).*

* cited by examiner

*Primary Examiner* — Jason D Recek
(74) *Attorney, Agent, or Firm* — Richard Eldredge; Leavitt Eldredge Law Firm

(57) ABSTRACT

A property damage detection system comprising a sensor device, a transmitter device, a receiver device, and a computing device, the sensor device configured to monitor and detect environmental conditions of a building, the transmitter device to convey the data, the receiver device configured to collect and transmit information from the sensor device to the computing device, the computing device configured to analyze the transmitted information and report to a user.

2 Claims, 3 Drawing Sheets

PROPERTY DAMAGE DETECTION SYSTEM AND METHOD OF USE

CROSS REFERENCE TO RELATED APPLICATIONS

This application is a continuation of U.S. application Ser. No. 16/893,171, filed Jun. 4, 2020, of which is hereby incorporated by reference in its entirety.

BACKGROUND

1. Field of the Invention

The present invention relates generally to visual property damage detection systems, and more specifically to a property damage detection system comprising of a sensor device configured to detect and monitor one or more environmental conditions.

2. Description of Related Art

Visual property damage detection systems are well known in the art and are effective means to evaluate hail damage to a building. Users are generally required to inspect hail damage in person or via cameras in a visual property damage detection system. Problems commonly associated with this is that it forces users to spend valuable time on inspection and that the data gathered is limited to visual information.

Accordingly, although great strides have been made in the area of visual property damage detection systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
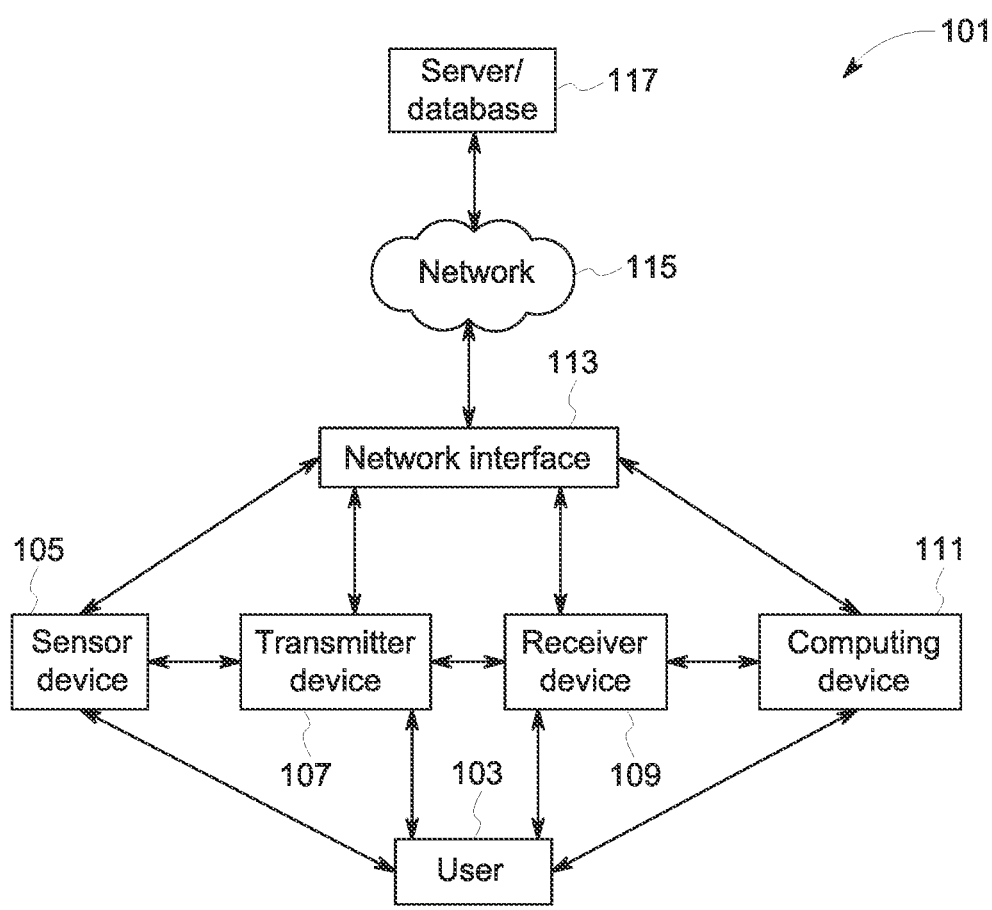
FIG. 1 is a block diagram of a preferred embodiment of the computer-implemented property damage detection system of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional hail damage detection systems. Specifically, the system of the present invention collects and transmits information of environmental conditions in real-time and preserves a record of the event(s). These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a block diagram of a computer-implemented property damage detection system in accordance with a preferred embodiment of the present application. It will be appreciated that system 101 overcomes one or more of the above-listed problems commonly associated with conventional property damage detection systems.

In the contemplated embodiment, system 101 includes a user 103, one or more sensor devices 105, one or more transmitter devices 107, one or more receiver devices 109, one or more computing devices 111, a network interface 113, a network 115, and a server/database 117.

The user 103 includes one or more persons interacting with system 101. The user 103 also includes a human, a non-human entity or a combination thereof. Examples of non-human entity users include, but are not limited to, a corporation, a partnership, a limited liability company, and other non-human business entities.

The one or more sensor devices 105 incorporate one or more sensors to monitor and detect one or more environmental conditions of its surroundings. In a preferred embodiment, the sensor device 105 may be installed on the outside structure of a building, embedded within the structure, a fixture, or a component of the building, or a combination thereof.

It is contemplated and will be appreciated that the one or more environmental conditions include vibration, acceleration, pressure, temperature, sound, infrared, motion, moisture, air movement, sunlight, weight, impact, orientation, seismic activity, and unauthorized human entry.

The one or more transmitter devices 107 are in communication with the one or more sensor devices 105 and the one or more receiver devices 109. The one or more transmitter devices 107 send data gathered from the one or more sensor devices 105 to the one or more receiver devices 109. Examples of the communication include wireless, Bluetooth, cellular, and the like. It is also contemplated and will be appreciated that the one or more transmitter devices 107 may be coupled with the one or more sensor devices 105 or as a standalone device.

The one or more receiver devices 109 are configured to gather data from the one or more transmitting devices 105 and send the data to one or more computing devices 111. It is contemplated and will be appreciated that the one or more receiver devices 109 may be located remotely from the one or more sensor devices 105, the one or more transmitter devices 107, or a combination thereof.

The computing device 111 is a portable electronic or desktop device configured with a user interface (not illustrated in FIG. 1). Examples of the computing device 111 include, but are not limited to, a desktop personal computer (PC), a notebook or portable computer, a workstation, a mainframe computer, an entertainment device, a cellular phone, a smart phone, a personal digital assistant (PDA), a field-programmable gate array device, a microcontroller, a tablet computer, phablets, an internet appliance, a scanning machine, a communication receiver, a pager, and the like. Further, the user interface is a means by which the user and the computing device interact. This can include display screens, keyboards, mouse and appearance of a desktop.

The network interface 113 facilitates communication with the sensor device, the receiver device, the computing device, and other computing systems (not illustrated in FIG. 1) via one or more networks 115. Examples of the network 115 include, but are not limited to, wireless network, wire-line network, public network such as the Internet, Intranet, private network, General Packet Radio Network (GPRS), Local Area Network (LAN), Wide Area Network (WAN), Low Power Long Range (LoRaWAN), Metropolitan Area Network (MAN), cellular network, Public Switched Telephone Network (PSTN), personal area network, and the like. The network 115 may be operable with cellular networks, Bluetooth network, Wi-Fi networks, or any other networks or combination thereof. Specifically, the network 115 is classified as a private network and a public network for the purpose of the method described herein. The private network is any network to which access is restricted. On the other hand, the public network is a network to which anyone can connect. Further, the network 115 may include network devices, such as network switches, hubs, routers, host bus adapters (HBAs), for providing a communication link between system 101 and other connected devices and/or systems.

The server/database 117 controls the storage, organization, and retrieval of data and information associated with hail damage detection systems, manages network resources, and executes various operations and functions associated with hail damage detection systems. The server/database 117 includes one or more servers with distributed processing and one or more databases. Additionally, the project manager server/database 117 may store, retrieve and send computer files and data to other computing devices on the network 115.

It should be appreciated that system 101 has wide-spread applications in various fields including insurance, weather, and forensic fields. For example, system 101 can (1) provide real-time monitoring and notification of events; (2) a record of monitored events; (3) data that can be utilized for a computerized analysis of events; (4) data that can be compared to forensic analysis of weather data; (5) data that can be compared to forensic analysis of physical damages; (6) monitoring of inaccessible or remote locations; (7) data for insurance claims analysis; (8) data for insurance underwriting analysis; (9) data for architectural building component recommendations; (10) historical loss analysis by location and region; (11) research data for building codes; (12) data for rating insurance underwriting; (13) data for damage prevention, mitigation, and restoration recommendations; (14) data for repair, restoration, and replacement recommendations; (15) data for code upgrade requirements for building components; (16) monitor of vandalism, weather-related events, extreme loss events, or a combination thereof; and (17) regional coordination of regional weather-related events.

It should also be appreciated that one of the unique features believed characteristic of the present application is that the one or more sensor devices 105 can detect, identify, and differentiate movement of a building, thereby determining the type of environmental condition the building is experiencing in real-time. For example, the sensor device 105 can differentiate between movement indicating hail, movement indicating seismic activity, movement indicating a person falling, and many others. The sensor device 105 makes the determination by measuring the amplitude and frequency of the movement on a three-dimensional plane (i.e., the x-axis, y-axis, and z-axis). From this, the sensor device 105 can eliminate possible causes of the movement and relay the data to the user in real-time, thereby allowing the user to take appropriate action.

Figure 2:
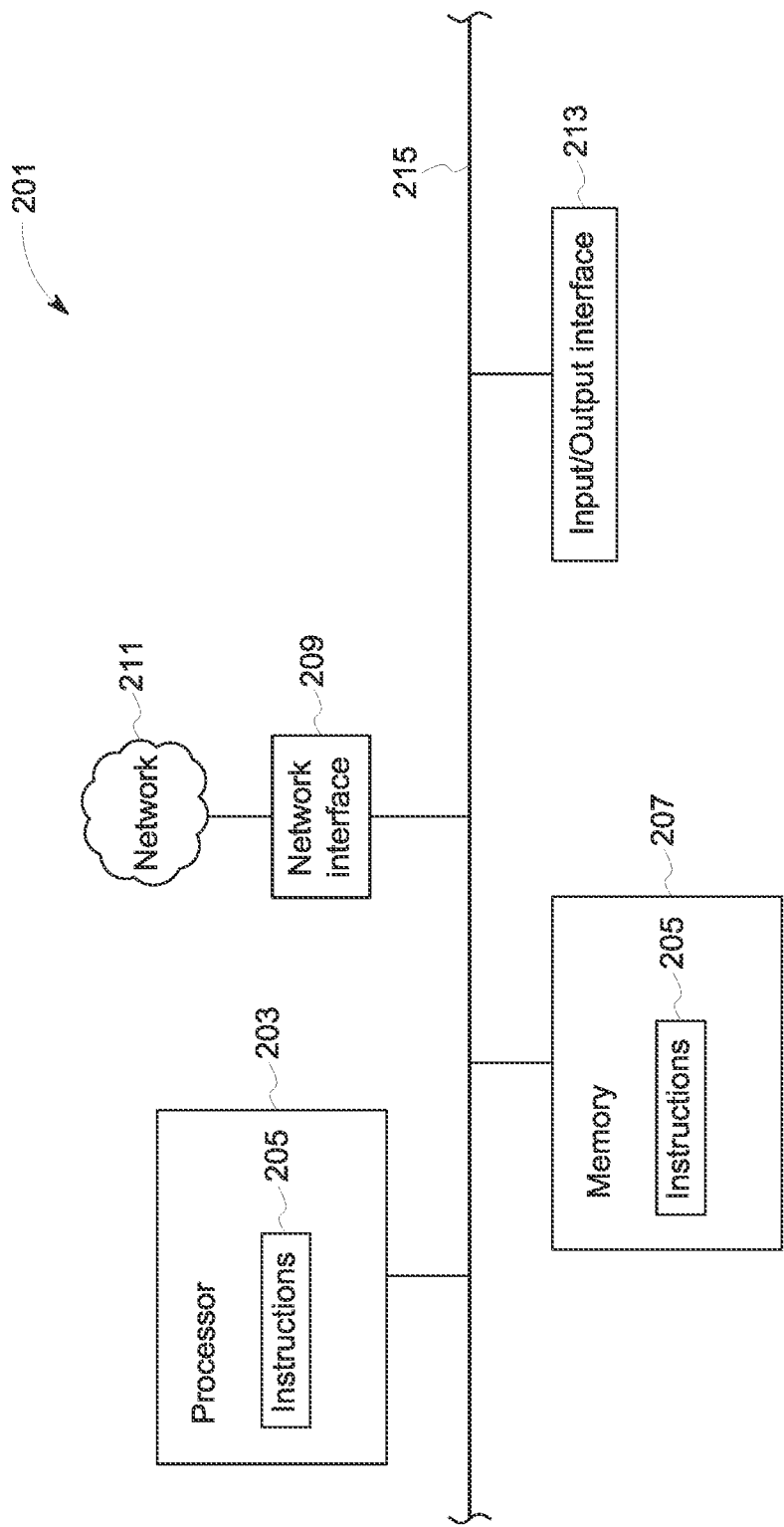
FIG. 2 is a block diagram of a preferred embodiment of the computer-implemented property damage detection system, illustrating an example of a computer system within which instructions for causing the machine to perform any one or more of the methodologies discussed herein may be executed.

FIG. 2 presents a block diagram of a machine in the example form of a computer system within which instructions for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet TC, a set-top box (STB), a PDA, a cellular phone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

In the contemplated embodiment, system 201 includes at least one processor 203 (e.g., central processing unit (CPU), system-on-a-chip (SoC), etc.) with or without instructions 205, a memory 207 with or without instructions 205, an input/output (I/O) interface 213, and a network interface 209, which communicate with each other via a bus 215 (e.g., extended industry standard architecture (EISA), conventional peripheral component interconnect (PCI), universal serial bus (USB), processor FireWire, NuBus, etc.). Instructions 205 may reside, completely or at least partially, within the processor 203 and/or memory 207 during execution thereof by system 201. Instructions 205 may include directions for storing instructions, performing one or more functions, and the like.

The network interface 209 facilitates communication between system 201 and other computing systems (not shown in FIG. 2) via the network 211.

It is contemplated and will be appreciated that system 201 may include one or more processors, one or more memory units, one or more networks, and one or more I/O interfaces.

It is also contemplated and will be appreciated that memory 207 may include any computer-readable medium or computer program product known in the art including, for example, volatile memory, such as static random access memory (SRAM) and dynamic random access memory (DRAM), and/or non-volatile memory, such as read-only memory (ROM), erasable programmable ROM, flash memories, hard disk drives (HDDS), solid-state drives (SSDs), embedded MultiMediaCards (eMMC), optical disks, compact disks (CDs), digital versatile disc or digital video disc (DVDs) and magnetic tapes. The memory 707 may further include one or more modules (not shown in FIG. 2) to perform the methodologies described herein.

It is also contemplated and will be appreciated that network 211 may be a wireless network, a wired network, or a combination thereof. Network 211 may also be an individual network or a collection of many such individual networks, interconnected with each other and functioning as a single large network, e.g., the Internet or an intranet. Network 211 may be implemented as one of the different types of networks, such as cellular, intranet, local area network (LAN), wide area network (WAN), the internet, near field communication (NFC), and such. Network 211 may either be a dedicated network or a shared network, which represents an association of the different types of networks that use a variety of protocols. Further, network 211 may include network devices, such as network switches, hubs, routers, host bus adapters (HBAs), for providing a communication link between system 201 and other connected devices and/or systems.

It is also contemplated and will be appreciated that the I/O interface 213 may include a variety of software and hardware interfaces (e.g., a web interface, a graphical user interface, and the like). The I/O interface 213 may allow system 201 to interact with a user directly or through the user devices. In addition, the I/O interface 213 may enable 201 to communicate with one or more sensors. Further, the I/O interface 213 may enable system 201 to communicate with other computing devices, such as web servers and external data servers (not shown in FIG. 2), or cloud computing systems.

It is likewise contemplated and will be appreciated that the I/O interface 213 can facilitate multiple communications within a wide variety of networks and protocol types, including wired networks, for example, LAN, cable, etc., and wireless networks, such as WLAN, cellular, or satellite. The I/O interface 213 may also include one or more ports for connecting a number of devices to one another or to another server.

Figure 3:
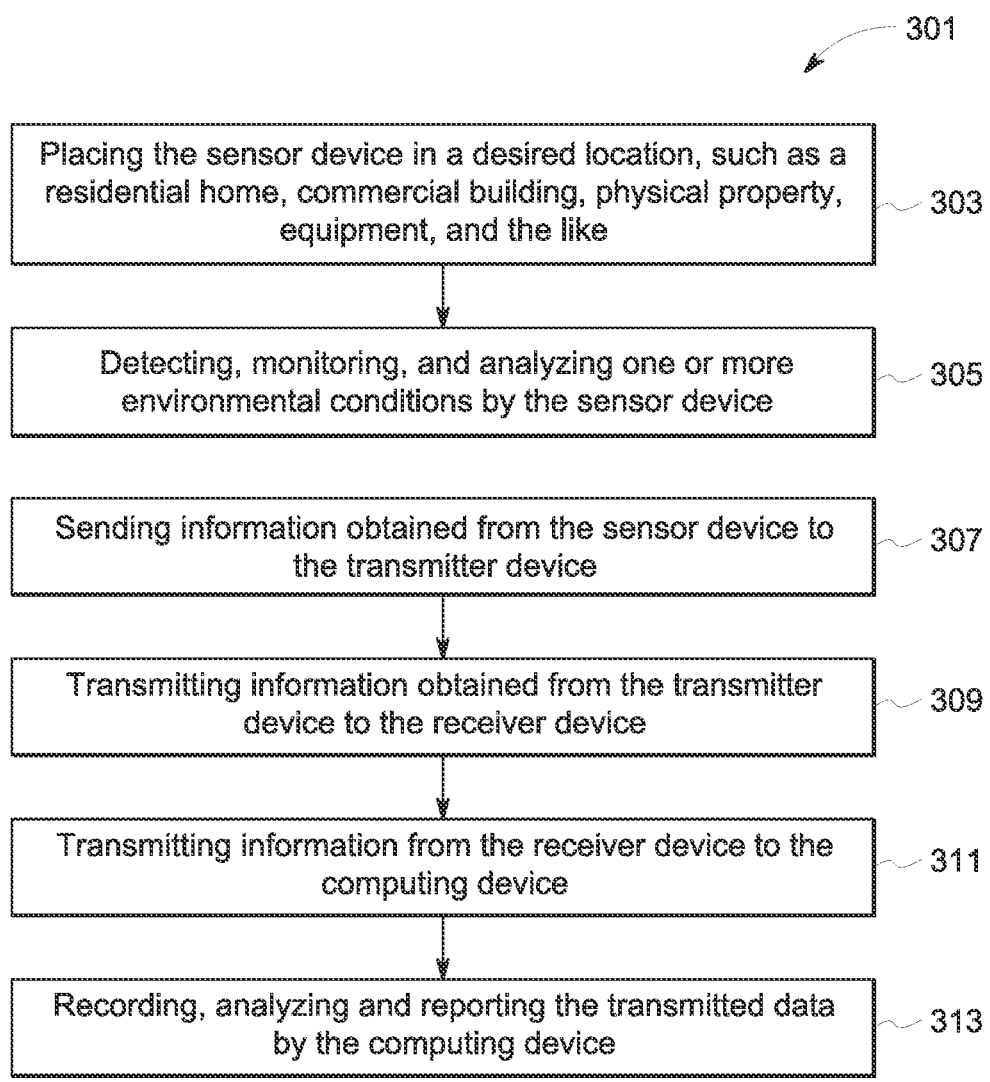
FIG. 3 is a flowchart of the method of use of the property damage detection system in accordance with the present application.

FIG. 3 depicts a flowchart of the method 301 of use of the property damage detection system in accordance with the present application. The method 301 initiates with step 303 of placing the sensor device in a desired location, such as a residential home, commercial building, physical property, equipment, and the like. The method 301 also includes a step 305 of detecting, monitoring, and analyzing one or more environmental conditions by the sensor device. The method 301 also includes step 307 of sending information obtained from the sensor device to the transmitter device. The method 301 also includes step 309 of transmitting information obtained from the transmitter device to the receiver device and step 311 of transmitting information obtained from the receiver device to the computing device. The method 301 further includes step 313 of recording, analyzing and reporting the transmitted data by the computing device.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of detecting environmental conditions, the method comprising: providing one or more sensor devices configured to monitor and detect one or more environmental conditions:
   providing one or more transmitting devices to send data to a receiver device; providing one or more receiver devices configured to collect and transmit data from the one or more sensor devices;
   providing a computer system to analyze data collected from the one or more sensors device and the one or more receiver devices;
   positioning the one or more sensor devices onto the structure of a building, within a fixture or component of a building, or a combination thereof;
   positioning the one or more transmitter devices incorporated within the one or more sensor devices or as an additional component installed elsewhere within or on the building;
   positioning the one or more receiver devices in the interior portion of a building or another remote location;
   receiving data from the one or more sensor devices, the one or more transmitter devices, the one or more receiver devices and the computer system;
   providing real-time monitoring and notification of events; providing a record of monitored events;
   providing data that can be utilized for a computerized analysis of events; providing data that can be compared to forensic analysis of weather data; providing data that can be compared to forensic analysis of physical damages; providing monitoring of inaccessible or remote locations;
   providing data for insurance claims analysis; providing data for insurance underwriting analysis;
   providing data for architectural building component recommendations; providing historical loss analysis by location and region;

providing research data for building codes; providing data for rating insurance underwriting; providing data for damage prevention, mitigation, and restoration recommendations;

providing data for repair, restoration, and replacement recommendations; providing data for code upgrade requirements for building components;

providing monitor of vandalism, weather-related events, extreme loss events, or a combination thereof;

providing regional coordination of regional weather-related events; and allowing a user to manage data from the one or more sensor devices, one or more transmitter devices, one or more receiver devices, computer system, or a combination thereof.

2. The method of claim 1, wherein the one or more environmental conditions includes one or more real-time and preserved evidence of vibration, acceleration, pressure, temperature, sound, infrared, motion, moisture, orientation, size of hail, shape of hail, weight of hail, seismic activity, unauthorized human entry, and other conditions that indicate damage or potential damage to a structure, fixture, or component of a building.

\* \* \* \* \*